US012670140B2

(12) United States Patent
Kumar et al.

(10) Patent No.: US 12,670,140 B2
(45) Date of Patent: Jun. 30, 2026

(54) TUNING A RETRIEVAL-AUGMENTED GENERATION PIPELINE BASED ON CONTEXT AND DOMAIN

(71) Applicant: AT&T Intellectual Property I, L.P., Atlanta, GA (US)

(72) Inventors: Ayush Kumar, East Brunswick, NJ (US); Isilay Baran, Morganville, NJ (US); Prafulla Verma, Holmdel, NJ (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 0 days.

(21) Appl. No.: 18/949,406

(22) Filed: Nov. 15, 2024

(65) Prior Publication Data

US 2026/0140931 A1 May 21, 2026

(51) Int. Cl.
G06F 16/22 (2019.01)
G06F 16/2457 (2019.01)
G06F 16/27 (2019.01)

(52) U.S. Cl.
CPC .... G06F 16/2237 (2019.01); G06F 16/24578 (2019.01); G06F 16/278 (2019.01)

(58) Field of Classification Search
CPC ........... G06F 16/2237; G06F 16/24578; G06F 16/278
See application file for complete search history.

(56) References Cited

U.S. PATENT DOCUMENTS

| | | | |
|---|---|---|---|
| 9,195,640 | B1 * | 11/2015 | Donneau-Golencer ...................... G10L 15/00 |
| 2015/0287235 | A1 * | 10/2015 | Rose ...................... H01Q 21/00 345/424 |
| 2018/0150236 | A1 * | 5/2018 | Todd ........................ G06F 11/14 |
| 2022/0156337 | A1 * | 5/2022 | Ssi-Yan-Kai ....... G06F 16/9538 |
| 2025/0094717 | A1 * | 3/2025 | Kanuga ................. G06F 40/289 |
| 2025/0200491 | A1 * | 6/2025 | Anwade ............... G06Q 30/015 |

* cited by examiner

*Primary Examiner* — Jay A Morrison

(57) ABSTRACT

An example method includes acquiring data from at least one data source of an enterprise, detecting a plurality of characteristics of the data, selecting, based on the plurality of characteristics, a partitioning technique for partitioning the data, partitioning, using the partitioning technique, the data to produce a plurality of data chunks, generating a plurality of vector embeddings of the plurality of data chunks, selecting metadata with which to augment the plurality of vector embeddings, augmenting the plurality of vector embeddings with the metadata, and applying an indexing algorithm to the plurality of vector embeddings to facilitate a storage of the plurality of vector embeddings.

20 Claims, 4 Drawing Sheets

100

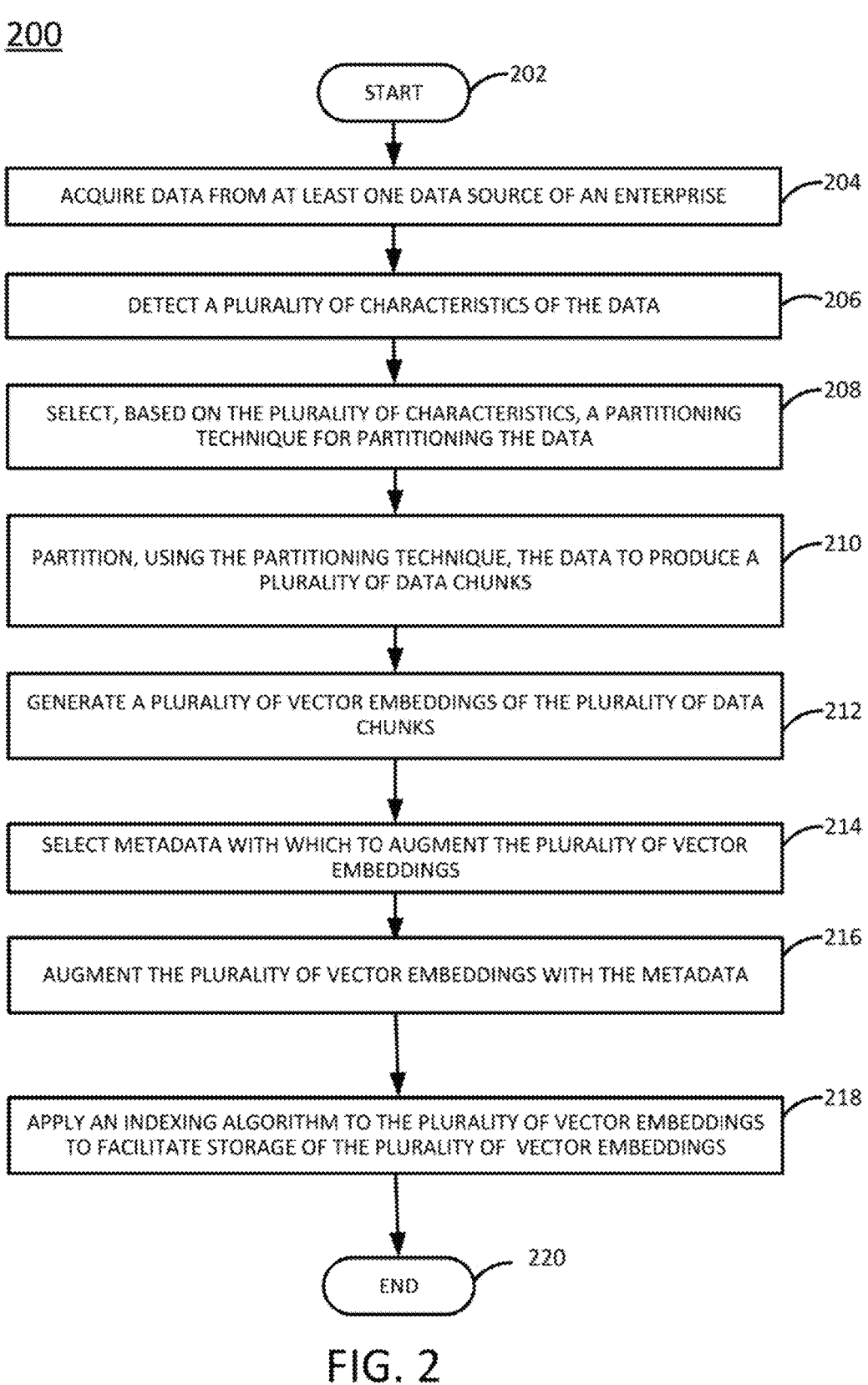

200

START — 202

ACQUIRE DATA FROM AT LEAST ONE DATA SOURCE OF AN ENTERPRISE — 204

DETECT A PLURALITY OF CHARACTERISTICS OF THE DATA — 206

SELECT, BASED ON THE PLURALITY OF CHARACTERISTICS, A PARTITIONING TECHNIQUE FOR PARTITIONING THE DATA — 208

PARTITION, USING THE PARTITIONING TECHNIQUE, THE DATA TO PRODUCE A PLURALITY OF DATA CHUNKS — 210

GENERATE A PLURALITY OF VECTOR EMBEDDINGS OF THE PLURALITY OF DATA CHUNKS — 212

SELECT METADATA WITH WHICH TO AUGMENT THE PLURALITY OF VECTOR EMBEDDINGS — 214

AUGMENT THE PLURALITY OF VECTOR EMBEDDINGS WITH THE METADATA — 216

APPLY AN INDEXING ALGORITHM TO THE PLURALITY OF VECTOR EMBEDDINGS TO FACILITATE STORAGE OF THE PLURALITY OF VECTOR EMBEDDINGS — 218

END — 220

FIG. 2

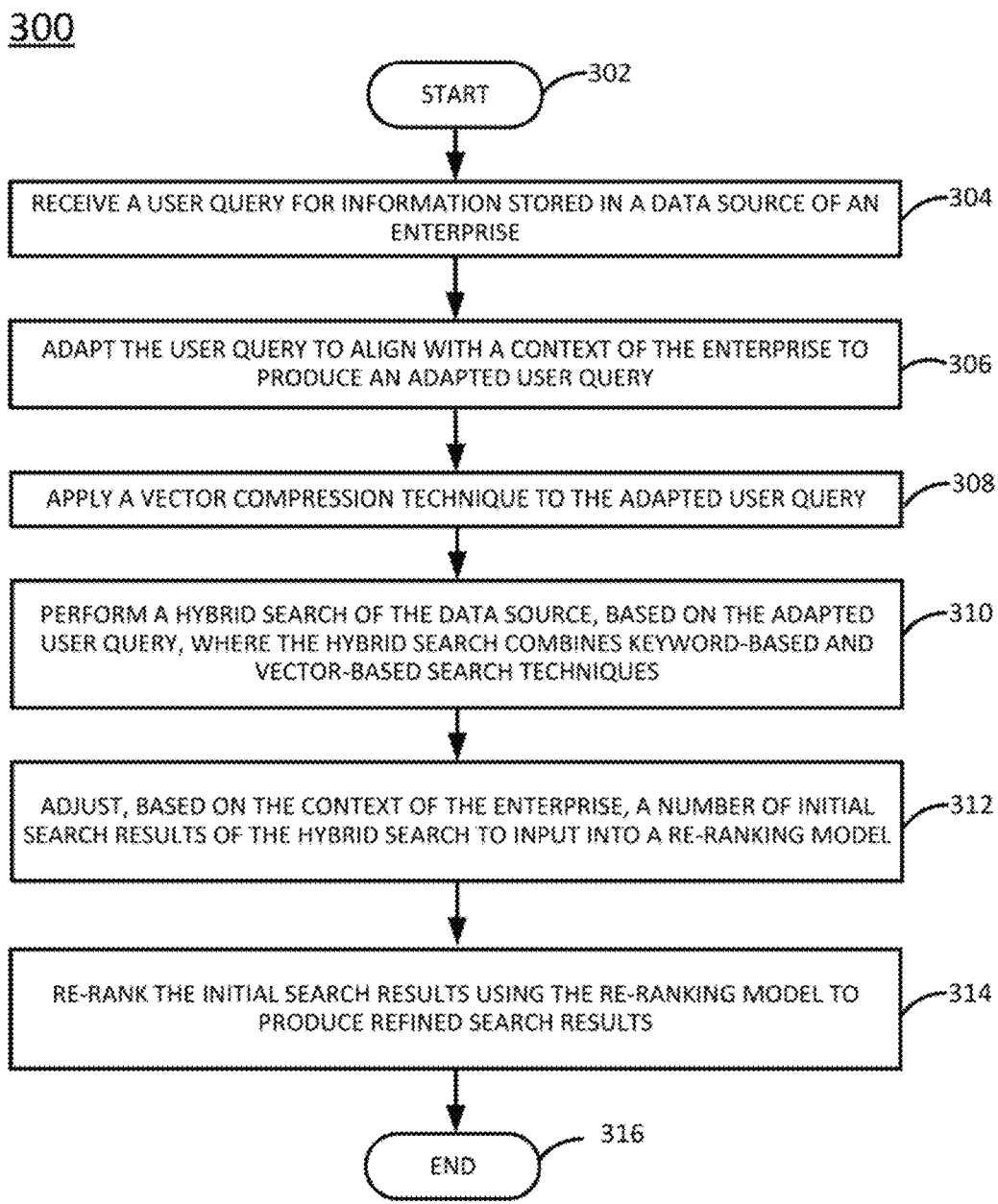

300

START ~302

RECEIVE A USER QUERY FOR INFORMATION STORED IN A DATA SOURCE OF AN ENTERPRISE ~304

ADAPT THE USER QUERY TO ALIGN WITH A CONTEXT OF THE ENTERPRISE TO PRODUCE AN ADAPTED USER QUERY ~306

APPLY A VECTOR COMPRESSION TECHNIQUE TO THE ADAPTED USER QUERY ~308

PERFORM A HYBRID SEARCH OF THE DATA SOURCE, BASED ON THE ADAPTED USER QUERY, WHERE THE HYBRID SEARCH COMBINES KEYWORD-BASED AND VECTOR-BASED SEARCH TECHNIQUES ~310

ADJUST, BASED ON THE CONTEXT OF THE ENTERPRISE, A NUMBER OF INITIAL SEARCH RESULTS OF THE HYBRID SEARCH TO INPUT INTO A RE-RANKING MODEL ~312

RE-RANK THE INITIAL SEARCH RESULTS USING THE RE-RANKING MODEL TO PRODUCE REFINED SEARCH RESULTS ~314

END ~316

TUNING A RETRIEVAL-AUGMENTED GENERATION PIPELINE BASED ON CONTEXT AND DOMAIN

The present disclosure relates generally to artificial intelligence, and relates more particularly to devices, non-transitory computer-readable media, and methods for tuning a retrieval-augmented generation pipeline based on context and domain.

BACKGROUND

Retrieval-Augmented Generation (RAG) is a process that optimizes the output of a large language model (LLM) so that the LLM references an authoritative knowledge base outside of the LLM's training data sources before generating an output. LLMs are trained on large volumes of data and use billions of parameters to generate original output for tasks like answering questions, translating languages, and completing sentences. A RAG pipeline extends the capabilities of an LLM to a specific domain (e.g., an enterprise's internal knowledge base) without the need to retrain the model. A RAG pipeline therefore provides a cost-effective way to improve LLM output so that the output remains relevant, accurate, and useful in various contexts.

SUMMARY

Devices, non-transitory computer-readable media, and methods for tuning a retrieval-augmented generation pipeline based on context and domain are disclosed. An example method includes acquiring data from at least one data source of an enterprise, detecting a plurality of characteristics of the data, selecting, based on the plurality of characteristics, a partitioning technique for partitioning the data, partitioning, using the partitioning technique, the data to produce a plurality of data chunks, generating a plurality of vector embeddings of the plurality of data chunks, selecting metadata with which to augment the plurality of vector embeddings, augmenting the plurality of vector embeddings with the metadata, and applying an indexing algorithm to the plurality of vector embeddings to facilitate a storage of the plurality of vector embeddings.

In another example, a non-transitory computer-readable medium stores instructions which, when executed by a processing system including at least one processor, cause the processing system to perform operations. The operations include acquiring data from at least one data source of an enterprise, detecting a plurality of characteristics of the data, selecting, based on the plurality of characteristics, a partitioning technique for partitioning the data, partitioning, using the partitioning technique, the data to produce a plurality of data chunks, generating a plurality of vector embeddings of the plurality of data chunks, selecting metadata with which to augment the plurality of vector embeddings, augmenting the plurality of vector embeddings with the metadata, and applying an indexing algorithm to the plurality of vector embeddings to facilitate a storage of the plurality of vector embeddings.

In another example, a device includes a processing system including at least one processor and a non-transitory computer-readable medium. The non-transitory computer-readable medium stores instructions which, when executed by the processing system, cause the processing system to perform operations. The operations include acquiring data from at least one data source of an enterprise, detecting a plurality of characteristics of the data, selecting, based on the plurality of characteristics, a partitioning technique for partitioning the data, partitioning, using the partitioning technique, the data to produce a plurality of data chunks, generating a plurality of vector embeddings of the plurality of data chunks, selecting metadata with which to augment the plurality of vector embeddings, augmenting the plurality of vector embeddings with the metadata, and applying an indexing algorithm to the plurality of vector embeddings to facilitate a storage of the plurality of vector embeddings.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for tuning a retrieval-augmented generation pipeline based on context and domain, in accordance with the present disclosure;

FIG. 3 illustrates a flowchart of an example method for tuning a retrieval-augmented generation pipeline based on context and domain, in accordance with the present disclosure.

To facilitate understanding, similar reference numerals have been used, where possible, to designate elements that are common to the figures.

DETAILED DESCRIPTION

Figure 1:
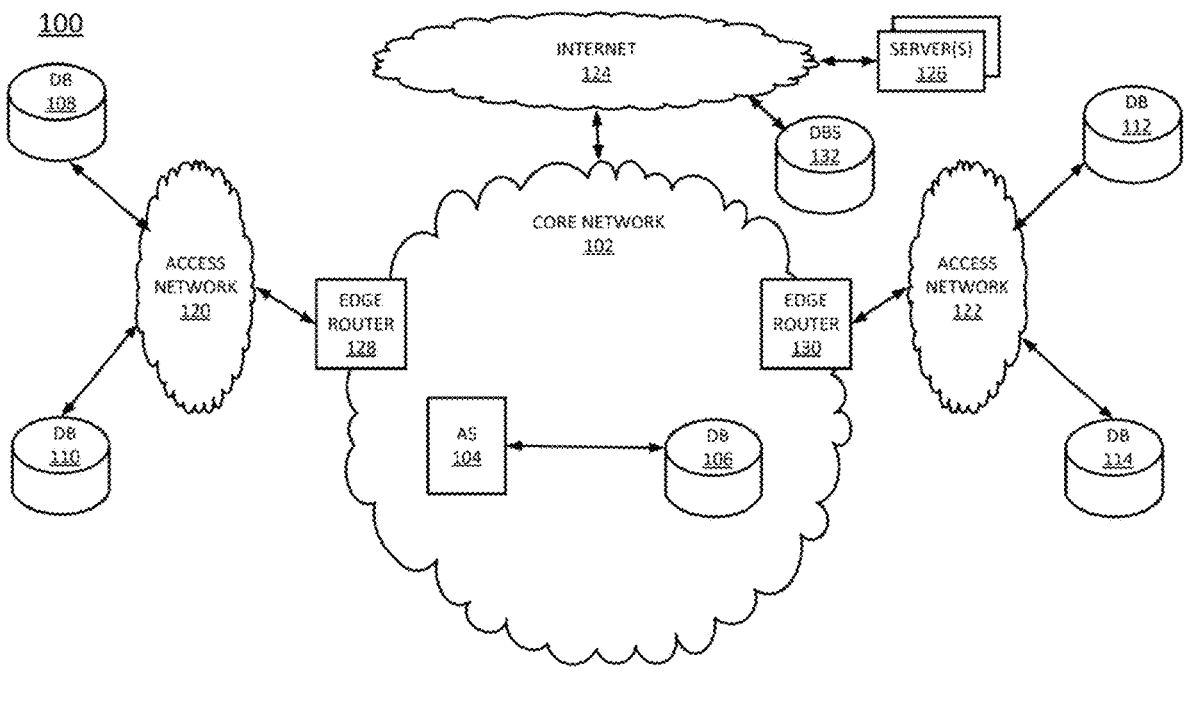
FIG. 1 illustrates an example system in which examples of the present disclosure for tuning a retrieval-augmented generation pipeline based on context and domain may operate.

The present disclosure broadly discloses methods, computer-readable media, and systems for tuning a retrieval-augmented generation pipeline based on context and domain. As discussed above, RAG is a process that optimizes the output of an LLM so that the LLM references an authoritative knowledge base outside of the LLM's training data sources before generating an output. LLMs are trained on large volumes of data and use billions of parameters to generate original output for tasks like answering questions, translating languages, and completing sentences. A RAG pipeline extends the capabilities of an LLM to a specific domain (e.g., an enterprise's internal knowledge base) without the need to retrain the model. A RAG pipeline therefore provides a cost-effective way to improve LLM output so that the output remains relevant, accurate, and useful in various contexts.

In the field of production-ready RAG applications, a central challenge is tailoring the RAG pipeline to specific industry contexts. Tailoring the RAG pipeline to a specific context requires addressing issues related to data cleaning, chunking, embedding models, metadata, compressing large quantities of data inside vector space, and contextualization of queries, while also ensuring seamless integration into the unique environment of the target industry or enterprise.

In the broader context of RAG applications, enterprises have faced challenges with generic LLMs that fail to account for industry-specific nuances, resulting sub-optimal results. For instance, in the telecommunications industry, a service provider's network may generate data in diverse forms and varieties and with distinct data formats and terminologies. As an example, a system for processing trouble tickets may generate logs that reflect a mix of network configurations and performance issues during network outages. Root cause analysis of acute subcategories in network outages covers telecommunications standards like "3GPP" (Third Generation Partnership Project) and "5G" (Fifth Generation), technologies such as "GSM" (Global System for Mobile Communications) and "LTE" (Long-Term Evolution), and different deployment scenarios like "macro cell" and "small cell." Terminology such as "churn," "disaster," and "throttling," and phrases like "address mismatch," "signal drop," and "outage" which may add to the complexity. Root cause analysis logs tell varied stories, and network performance reports differ in both volume and variety. Generic RAG solutions are of limited utility in such contexts.

Past efforts focused on generic data cleaning, pre-processing, and chunking techniques have often overlooked the importance of tailoring processes to industry-specific requirements. Conventional natural language processing (NLP)-like tuning models have adjusted hyperparameters, but the generic nature of these tuning models falls short in capturing unique technologies and intricacies. Other past approaches involved creating standardized question and answer (Q&A) systems but lacked adaptability for dynamic industry contexts.

Examples of the present disclosure perform context-based tuning of RAG pipelines, emphasizing holistic customization from data ingestion to inferencing to ensure optimization for an enterprise's particular needs. In one example, the RAG pipeline begins with a careful ingestion stage and an efficient inference stage, which highlights the importance of chunking, embedding models, metadata, multi-indexing, and indexing algorithms. The pipeline is then extended to query transformation, vector compression, and retrieval strategies, which lays the groundwork for a strong and customized RAG pipeline in which the retrieval and generation stages are fine-tuned for the complexities of a specific enterprise's data.

The disclosed approach addresses the above-discussed challenges posed by domain-specific terminologies. Customizing the RAG pipeline for a specific enterprise may boost retrieval accuracy and pave the way for enhanced generative capabilities, extending into the inference stage. Experimental results have shown that the disclosed approach may improve retrieval evaluation metrics for a RAG application by approximately five to ten percent. These and other aspects of the present disclosure are discussed in greater detail below in connection with the examples of FIGS. 1-4.

To further aid in understanding the present disclosure, FIG. 1 illustrates an example system 100 in which examples of the present disclosure for tuning a retrieval-augmented generation pipeline based on context and domain may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks, such as access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise a Digital Subscriber Line (DSL) network, a public switched telephone network (PSTN) access network, a broadband cable access network, a Local Area Network (LAN), a wireless access network (e.g., an IEEE 802.11/ Wi-Fi network and the like), a cellular access network, a $3^{rd}$ party network, and the like. In one example, the core network 102 may be operated by a telecommunication network service provider. The core network 102 and the access networks 120 and 122 may be operated by different service providers, the same service provider or a combination thereof, or the access networks 120 and 122 may be operated by an entity having a core business that is not related to telecommunications services, e.g., corporate, governmental, or educational institution LANs, and the like.

In one example, the access network 120 may be in communication with one or more data sources, such as databases (DBs) 108 and 110. The access network 120 may transmit and receive communications between the DBs 108 and 110, between the DBs 108 and 110 and the server(s) 126, the AS 104, other components of the core network 102, devices reachable via the Internet in general, and so forth. Similarly, the access network 122 may be in communication with one or more DBs 112 and 114. The access network 122 may transmit and receive communications between the DBs 112 and 114, between the DBs 112 and 114 and the server(s) 126, the AS 104, other components of the core network 102, devices reachable via the Internet in general, and so forth.

Each of the DBs 108, 110, 112, and 114 may be associated with a different system of an enterprise that generates data. For instance, if the enterprise is a telecommunications network service provider, one DB may store data relating to a troubleshooting and ticketing system, another DB may store data relating to subscriber billing, another DB may store data relating to network topology, and so on. Thus, at least two of the DBs 108, 110, 112, and 114 may store different types of data. These DBs 108, 110, 112, and 114 may be physically located in the same location or in different locations, and each DB 108, 110, 112, and 114 may store vast amounts of data.

In one example, the DBs 108, 110, 112, and 114 may be accessible to one or more servers 126 via the Internet 124 in general. Data such as the data stored in the DBs 108, 110, 112, and 114 may also be stored in DBs 132 that are accessible by the server(s) 126 and/or by the AS 104. The server(s) 126 may operate in a manner similar to the AS 104, which is described in further detail below.

In accordance with the present disclosure, the AS 104, DB 106 may be configured to provide one or more operations or functions in connection with examples of the present disclosure for tuning a retrieval-augmented generation pipeline based on context and domain, as described herein. For instance, the AS 104 may be configured to perform operations related to retrieval-augmented generation by generating responses to user queries using data stored in any of the DBs 106, 108, 110, 112, 114, and/or 132.

To this end, the AS 104 may comprise one or more physical devices, e.g., one or more computing systems or servers, such as computing system 400 depicted in FIG. 4, and may be configured as described below. The AS 104 may have access to at least some of the DBs 106, 108, 110, 112, 114, and/or 132.

In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for tuning a retrieval-augmented generation pipeline based on context and domain, as described herein. Example methods for tuning a retrieval-augmented generation pipeline based on context and domain are described in greater detail below in connection with FIG. 2 and FIG. 3.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, media streaming server, a content distribution network (CDN) and the like. For example, portions of the core network 102, access networks 120 and 122, and/or Internet 124 may comprise a content distribution network (CDN) having ingest servers, edge servers, and the like. Similarly, although only two access networks 120 and 122 are shown, in other examples, the access networks 120 and 122 may comprise a plurality of different access networks that may interface with the core network 102 independently or in a chained manner. For example, DBs 108-114 may communicate with the core network 102 via different access networks. Thus, these and other modifications are all contemplated within the scope of the present disclosure.

FIG. 2 illustrates a flowchart of an example method 200 for tuning a retrieval-augmented generation pipeline based on context and domain, in accordance with the present disclosure. More specifically, the method 200 may represent steps for the data ingestion stage of a RAG pipeline. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may acquire data from at least one data source of an enterprise.

In one example, the enterprise may comprise a business that maintains a plurality of different data sets stored in a plurality of different data sources. For instance, the enterprise may comprise a telecommunications network service provider. In this case, one such data source maybe a trouble ticket system that processes reports of the outages in the telecommunications network. Where the telecommunications network is a 5G mobility network, there may be ten billion or more registration records for outage events generated by the trouble ticketing system alone.

In one example, data may be acquired from a diverse set of data sources in step 204 to ensure representation of a maximal number of unique terminologies that may be used by the enterprise. For instance, in the above example of a telecommunications service provider, terminology like "churn," "disaster," "throttling," "address mismatch," "signal drop," "outage," and the like may have meanings that are specific to the telecommunications network industry (or other industries of which the enterprise may be a part), and these meanings may differ from more commonly understood meanings (if any) for the terminology. As an example, in the telecommunications industry, "churn" may specifically refer to customers who the telecommunications network service provider has lost within a specified period of time, while the more generic meaning of the word "churn" might refer to moving liquid vigorously.

In step 206, the processing system may detect a plurality of characteristics of the data. In one example, the automatically detected characteristics may include content of the data. For instance, for data acquired from a trouble ticketing system that produces tickets related to network outages and other events, the tickets typically describe the network outages in a few sentences. In this case, the characteristics may include content of these sentences. Similarly, an alert system that generates alerts related to events in the network that may require some action produces alerts that describe the events in a few sentences. In this case, the characteristics may include content of these sentences. As another example, the data may include documents related to system engineering which are several paragraphs long. In this case, the characteristics may include consistent paragraph content with some overlap for understanding of the sequence and content of the system engineering document. In another example, the data may include code for a software program, which is treated differently by the processing system than generic text.

In step 208, the processing system may select, based on the plurality of characteristics, a partitioning technique for partitioning the data. In one example, partitioning may also be referred to as "chunking." Within the context of RAG pipelines, chunking is a process that breaks large pieces of text into smaller segments or chunks. There are many different techniques that may be used to perform chunking of data, including fixed size chunking, content aware chunking, recursive chunking, specialized chunking, semantic chunking, and other techniques. The unique characteristics of the data will necessitate a specialized partitioning (or chunking) technique.

In one example, the partitioning technique is selected to encapsulate contextually meaningful information while preserving the integrity of data patterns that are specific to the enterprise or industry in which the enterprise is involved. For instance, where the enterprise is a telecommunications network service provider, data patterns whose integrity should be preserved may include data patterns relating to network configurations and performance registration failures. Thus, the desired sizes of the data chunks and any desired overlap between two or more data chunks (e.g., common data shared between the two or more data chunks) may be carefully selected to align with useful retrieval (e.g., by an inferencing process that is described below in connection with FIG. 3).

Since different data will be associated with different contexts, there may also be differences in the volumes of different data. Volume may play an important role in capturing meaningful data during partitioning. For instance, data associated with troubleshooting tickets is generally shorter than data associated with root cause analysis and network outages; thus different strategies may be used to partition data related to troubleshooting tickets as opposed to data relating to root cause analysis and network outages. In other words, different partitioning techniques may be used to partition data acquired from different data sources and data of different types.

In step 210, the processing system may partition, using the selected partitioning technique, the data to produce a plurality of data chunks. Applying the partitioning technique that is selected in step 208 will result in the data being transformed into a plurality of data chunks, where each data chunk comprises some subset of the data (e.g., less than an entirety of the data) that retains useful context.

In step 212, the processing system may generate a plurality of vector embeddings of the plurality of data chunks. Generating embeddings of the data chunks plays an important role in capturing the nuances of domain-specific language that is specific to the enterprise or the industry in which the enterprise operates. For instance, as discussed above, terminology such as "churn," "disaster," and "throttling," and phrases such as "address mismatch," "signal drop," and "outage" may have different meanings in the context of telecommunications networks than in everyday language.

Thus, in one example, the plurality of vector embeddings may be generated using an embedding model that is tuned to (i.e., trained on) terminology that is specific to the enterprise or the industry in which the enterprise operates. The resultant vector embeddings may accurately represent the unique context of the enterprise's diverse data set.

In step 214, the processing system may select metadata with which to augment the plurality of vector embeddings.

The metadata that is selected in step 214 may provide context for the vector embeddings. For instance, where the enterprise is a telecommunications network service provider, the context may include elements like a configuration of an associated network, a topology of an associated network, an associated service type which varies with the generation of technology that the service type belongs to (e.g., 4G, LTE, 5G, 6G, etc.), and/or other telecommunications network-specific attributes.

In step 216, the processing system may augment the plurality of vector embeddings with the metadata. For instance, the vector embeddings may be annotated with the metadata that is selected in step 214.

In step 218, the processing system may apply an indexing algorithm to the plurality of vector embeddings to facilitate storage of the plurality of vector embeddings. In one example, the indexing algorithm may create different indices for different data sets (e.g., text data, image data, video data, or the like) within the enterprise's data sources. This allows the vector embeddings to be stored in a manner that enhances scalability and accessibility for efficient retrieval (e.g., by an inferencing process such as that described below in connection with FIG. 3). In one example, multi-indexing and indexing algorithms may be used in step 218 to efficiently organize the diverse data sets acquired and processed by the method 200. The method 200 may end in step 220.

Thus, the method 200 may train a RAG pipeline to efficiently respond to user queries for data contained in an enterprise's data sources (i.e., to make inferences). Moreover, stages of the training process, such as chunking/partitioning and generating vector embeddings, are tuned or trained for enterprise- or industry-specific terminology, which improves the accuracy and relevance of any outputs generated by the inference process.

FIG. 3 illustrates a flowchart of an example method 300 for tuning a retrieval-augmented generation pipeline based on context and domain, in accordance with the present disclosure. More specifically, the method 300 may represent steps for the data inference stage of a RAG pipeline. In one example, steps, functions and/or operations of the method 300 may be performed by a device as illustrated in FIG. 1, e.g., AS 104 or any one or more components thereof. In another example, the steps, functions, or operations of method 300 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 300 is described in greater detail below in connection with an example performed by a processing system, such as processing system 402.

The method 300 begins in step 302 and proceeds to step 304. In step 304, the processing system may receive a user query for information stored in a data source of an enterprise.

In one example, the user query may be a query that can be answered using data stored in the data source. As discussed above, the enterprise may comprise a business that maintains a plurality of different data sets stored in a plurality of different data sources. For instance, the enterprise may comprise a telecommunications network service provider. In this case, one such data source may be a trouble ticket system that processes reports of the outages in the telecommunications network. Where the telecommunications network is a 5G mobility network, there may be ten billion or more registration records for outage events generated by the trouble ticketing system alone.

In step 306, the processing system may adapt the user query to align with a context of the enterprise to produce an adapted user query. For instance, in one example, adapting the user query may comprise detecting terminology that has multiple meanings, including an enterprise- or industry-specific meaning, and interpreting the terminology in accordance with the enterprise- or industry-specific meaning. As an example, a user query relating to "churn" may consider the specific implications of the term "churn" within the telecommunications network industry. Adapting the user query may further comprise rephrasing the user query to better match the language used in within the enterprise (and the enterprise's data sources). Thus, adapting the user query improves the precision and relevance of subsequent information retrieval by the processing system by tailoring the user query to the unique phrasing and data nuances of the enterprise.

In step 308, the processing system may apply a vector compression technique to the adapted user query. When dealing with relatively large data sets (e.g., ten billion or more registration records of outage events in a 5G mobility network processed by a trouble ticketing system), vector compression may be crucial to optimizing the computational efficiency of query processing. Vector compression techniques acknowledge the unique demands of an enterprise's data scale and ensure a balance between speed and accuracy in information retrieval. The vector compression technique that is applied may be selected to manage latency in the data retrieval process efficiently.

In one example, the vector compression technique may comprise at least one of: discrete cosine transform (DCT), wavelet transform, Huffman coding, scalar quantization (SQ), K-means clustering, LZ77, wavelet decomposition, classified vector quantization, and/or another type of vector compression technique.

In step 310, the processing system may perform a hybrid search of the data source, based on the adapted user query, where the hybrid search combines keyword-based and vector-based search techniques. In one example, the hybrid search incorporates both semantic (e.g., vector-based) and keyword-based search techniques to search the data source for items of data that will match the adapted user query. The combination of semantic and keyword-based searching helps the processing system to balance the nuanced meanings of enterprise- and industry-specific terms (like "churn" or "disaster" for the telecommunications network industry) in different contexts, so that the search results are more precise and more relevant to the enterprise's unique context. For instance, in the context of the telecommunication network industry, incorporation of diverse telecommunications standards (e.g. "3GPP," "5G," and the like), technologies (e.g., "GSM," "LTE," and the like), and deployment scenarios (e.g., "macro cell," "small cell," and the like) in root cause analysis may enrich the hybrid search context and provide a comprehensive understanding of network outages and performance patterns.

In step 312, the processing system may adjust, based on the context of the enterprise, a number of initial search results of the hybrid search to input into a re-ranking model. In RAG pipelines, a re-ranking model may be used to enhance the precision and relevance of the search results by refining an initial set of search results to more closely align with user intent and/or enterprise context. Re-ranking also ensures that LLMs in the RAG pipeline are working with the most pertinent and contextually relevant information. In one example, the number of results that is input to the re-ranking model is adjusted based on the specific context of the enterprise or industry in which the enterprise operates. This ensures that the results of the data retrieval process are better aligned with the expectations of the enterprise.

In step 314, the processing system may re-rank the initial search results using the re-ranking model to produce refined search results. As discussed above, the refined search results may align more closely to the context of the enterprise and/or industry in which the enterprise operates than the initial search results, and may therefore be more relevant to the user query than the initial search results. The method 300 may end in step 316.

Although examples of the methods 200 and 300 have been discussed within the context of an enterprise that is a telecommunications network service provider, it will be appreciated that the methods 200 and 300 may be extended to improve the output of RAG pipelines in any industry. For instance, vector embedding models and hybrid search techniques may be tuned to the specific terminology of any context, domain, or industry; telecommunications networks are merely provided herein as one example of an industry with unique terminology.

It should be noted that the method 200 and the method 300 may be expanded to include additional steps or may be modified to include additional operations, parameters, or scores with respect to the steps outlined above. In addition, although not specifically specified, one or more steps, functions, or operations of the method 200 or the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 4:
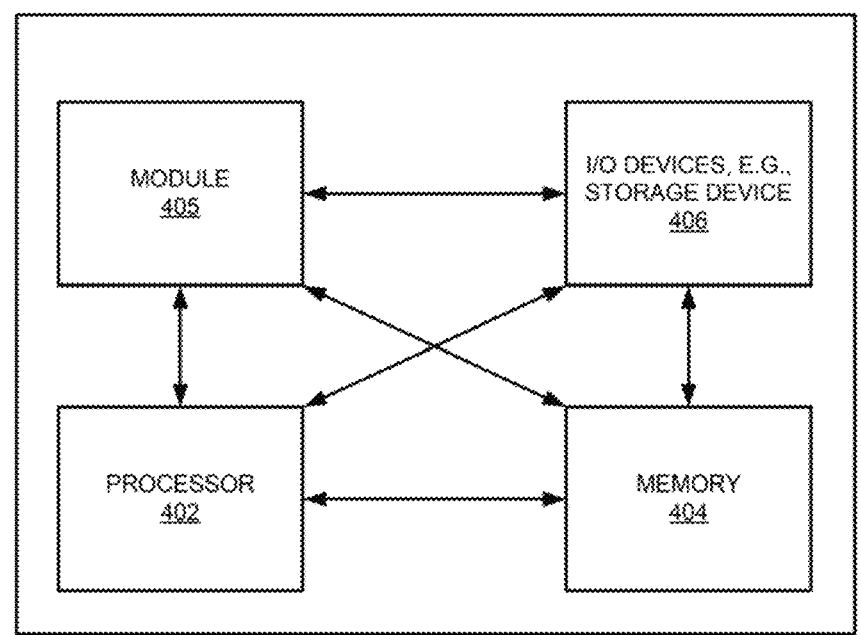
FIG. 4 illustrates an example of a computing device, or computing system, specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for tuning a retrieval-augmented generation pipeline based on context and domain, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or method 300 as discussed above is implemented in a distributed or parallel manner for a particular illustrative example, i.e., the steps of the above method 200 or method 300 or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or the method 300. In one example, instructions and data for the present module or process 405 for tuning a retrieval-augmented generation pipeline based on context and domain (e.g., a software program comprising computer-executable instructions) can be loaded into memory 404 and executed by hardware processor element 402 to implement the steps, functions, or operations as discussed above in connection with the illustrative method 200 or the method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for tuning a retrieval-augmented generation pipeline based on context and domain (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

acquiring, by a processing system including at least one processor, data from at least one data source of an enterprise;

detecting, by the processing system, a plurality of characteristics of the data;

selecting, by the processing system based on the plurality of characteristics, a partitioning technique for partitioning the data;

partitioning, by the processing system using the partitioning technique, the data to produce a plurality of data chunks;

generating, by the processing system, a plurality of vector embeddings of the plurality of data chunks;

selecting, by the processing system, metadata with which to augment the plurality of vector embeddings;

augmenting, by the processing system, the plurality of vector embeddings with the metadata;

applying, by the processing system, an indexing algorithm to the plurality of vector embeddings to facilitate a storage of the plurality of vector embeddings; and wherein the method trains the processing system to perform operations related to a retrieval-augmented generation using the data by:

receiving, by the processing system, a user query for information stored in the at least one data source;

adapting, by the processing system, the user query to align with a context of the enterprise to produce an adapted user query;

applying, by the processing system, a vector compression technique to the adapted user query to minimize a latency in a retrieval of initial search results by a hybrid search executing the adapted user query against the at least one data source;

performing, by the processing system, the hybrid search of the at least one data source, based on the adapted user query, where the hybrid search combines a keyword-based search technique and a vector-based search technique;

adjusting, by the processing system based on the context of the enterprise, a number of the initial search results of the hybrid search to input into a re-ranking model; and re-ranking, by the processing system, the initial search results using the re-ranking model to produce refined search results.

2. The method of claim 1, wherein the at least one data source is one of a plurality of data sources associated with the enterprise, and wherein at least two data sources of the plurality of data sources store different types of data.

3. The method of claim 1, wherein each data chunk of the plurality of data chunks comprises a subset of the data that is less than an entirety of the data.

4. The method of claim 1, wherein the partitioning technique is at least one of: a fixed size chunking technique, a content aware chunking technique, a recursive chunking technique, a specialized chunking technique, or a semantic chunking technique.

5. The method of claim 1, wherein the partitioning technique is selected to produce a desired chunk size and a desired degree of overlap among the plurality of data chunks.

6. The method of claim 5, wherein the desired chunk size and the desired degree of overlap are tuned to preserve contextual information in the plurality of data chunks.

7. The method of claim 5, wherein the at least one data source comprises a first data source and a second data source, and the partitioning technique selected to partition a portion of the data acquired from the first data source is different from the partitioning technique selected to partition a portion of the data acquired from the second data source.

8. The method of claim 1, wherein the plurality of vector embeddings is generated using an embedding model that has been trained on a terminology that is unique to the enterprise.

9. The method of claim 8, wherein the terminology includes terms that have meanings to the enterprise that are different from commonly understood meanings of the terms.

10. The method of claim 9, wherein the enterprise comprises a telecommunications network service provider, and the terms relate to at least one of: a telecommunications standard, a technology, or a deployment scenario.

11. The method of claim 1, wherein the enterprise comprises a telecommunications network service provider, and the metadata includes data related to at least one of: a configuration of an associated telecommunications network, a topology of an associated telecommunications network, or an associated service type which varies with a generation of technology the service type belongs to.

12. The method of claim 1, wherein the indexing algorithm creates different indices for different types of data.

13. The method of claim 1, wherein the indexing algorithm comprises a multi-indexing algorithm.

14. The method of claim 1, wherein the adapting comprises rephrasing the user query to better match the context of the enterprise.

15. The method of claim 1, wherein the vector compression technique comprises at least one of: a discrete cosine transform, a wavelet transform, a Huffman coding, a scalar quantization, a k-means clustering, a LZ77, wavelet decomposition, or a classified vector quantization.

16. The method of claim 1, wherein the refined search results are better aligned with the context of the enterprise than the initial search results.

17. A non-transitory computer-readable medium storing instructions which, when executed by a processing system including at least one processor, cause the processing system to perform operations, the operations comprising:

acquiring data from at least one data source of an enterprise;

detecting a plurality of characteristics of the data;

selecting, based on the plurality of characteristics, a partitioning technique for partitioning the data;

partitioning, using the partitioning technique, the data to produce a plurality of data chunks;

generating a plurality of vector embeddings of the plurality of data chunks;

selecting metadata with which to augment the plurality of vector embeddings;

augmenting the plurality of vector embeddings with the metadata;

applying an indexing algorithm to the plurality of vector embeddings to facilitate a storage of the plurality of vector embeddings; and wherein the operations further train the processing system to perform operations related to a retrieval-augmented generation using the data by:

receiving a user query for information stored in the at least one data source;

adapting the user query to align with a context of the enterprise to produce an adapted user query;

applying a vector compression technique to the adapted user query to minimize a latency in a retrieval of initial search results by a hybrid search executing the adapted user query against the at least one data source;

performing the hybrid search of the at least one data source, based on the adapted user query, where the hybrid search combines a keyword-based search technique and a vector-based search technique;

adjusting, based on the context of the enterprise, a number of the initial search results of the hybrid search to input into a re-ranking model; and re-ranking the initial search results using the re-ranking model to produce refined search results.

18. A device comprising:

a processing system including at least one processor; and a non-transitory computer-readable medium storing instructions which, when executed by the processing system, cause the processing system to perform operations, the operations comprising:

acquiring data from at least one data source of an enterprise;

detecting a plurality of characteristics of the data;

selecting, based on the plurality of characteristics, a partitioning technique for partitioning the data;

partitioning, using the partitioning technique, the data to produce a plurality of data chunks;

generating a plurality of vector embeddings of the plurality of data chunks;

selecting metadata with which to augment the plurality of vector embeddings;

augmenting the plurality of vector embeddings with the metadata;

applying an indexing algorithm to the plurality of vector embeddings to facilitate a storage of the plurality of vector embeddings; and wherein the operations further train the processing system to perform operations related to a retrieval-augmented generation using the data by:

receiving a user query for information stored in the at least one data source;

adapting the user query to align with a context of the enterprise to produce an adapted user query;

applying a vector compression technique to the adapted user query to minimize a latency in a retrieval of initial search results by a hybrid search executing the adapted user query against the at least one data source;

performing the hybrid search of the at least one data source, based on the adapted user query, where the hybrid search combines a keyword-based search technique and a vector-based search technique;

adjusting, based on the context of the enterprise, a number of the initial search results of the hybrid search to input into a re-ranking model; and re-ranking the initial search results using the re-ranking model to produce refined search results.

19. The method of claim 12, wherein the different indices enable the plurality of vector embeddings to be stored in a manner that improves an efficiency with which the hybrid search is able to access the plurality of vector embeddings.

20. The method of claim 1, wherein the combining the keyword-based technique and the vector-based search technique balances meanings of enterprise-specific and industry-specific terms in a manner that improves a relevance of the initial search results to the context of the enterprise.

\* \* \* \* \*